United States Patent [19]
Meldrum et al.

[11] 3,831,920
[45] Aug. 27, 1974

[54] NOISE PREVENTING SHOCK ABSORBER

[75] Inventors: Charles R. Meldrum, Detroit; Glyn A. Bindon, Oxford, both of Mich.

[73] Assignee: Ace Controls, Inc., Farmington, Mich.

[22] Filed: Jan. 12, 1973

[21] Appl. No.: 323,060

[52] U.S. Cl.............. 267/137, 267/141, 267/153, 267/63 R
[51] Int. Cl.............................................. F16f 7/12
[58] Field of Search ........... 267/137, 140, 141, 152, 267/153, 63 A

[56] References Cited
UNITED STATES PATENTS

| | | | |
|---|---|---|---|
| 2,719,017 | 9/1955 | Mordaski et al. | 267/153 |
| 2,783,959 | 3/1957 | Boschi et al. | 267/63 A |

FOREIGN PATENTS OR APPLICATIONS

| | | | |
|---|---|---|---|
| 242,947 | 9/1969 | U.S.S.R. | 263/152 |

*Primary Examiner*—James B. Marbert
*Attorney, Agent, or Firm*—Robert G. Mentag

[57] ABSTRACT

A noise preventing shock absorber adapted for silently absorbing the sound due to noise sources, as when moving machine parts engage mating surfaces and decelerate to zero velocity within a short travel distance or stroke. The shock absorber member includes a unitary resilient member which is dish-shaped in vertical cross section and provided with an axial bore therethrough, with the peripheral surface of the axial bore forming an inner force-transmitting surface. An upper force-receiving means is bonded to the inner force-transmitting surface. The resilient member is provided with a peripheral outer force-transmitting surface concentric with and axially offset downwardly from the inner force-transmitting surface. The resilient member is also provided with an axially inward extended recess on the lower side thereof around the axial bore and within the outer force-transmitting surface. A lower force-receiving means as, for example, an outer tube is bonded to the outer force-transmitting surface. The shock absorber may be used in a stacked arrangement to provide a unit of increased shock absorbing and noise preventing capacity.

7 Claims, 6 Drawing Figures

NOISE PREVENTING SHOCK ABSORBER

SUMMARY OF THE INVENTION

This invention generally relates to noise preventing apparatuses, and more particularly, to a novel and improved noise preventing shock absorber for preventing noises due to moving impact loads decelerating to zero velocity and impacting with a mating surface.

The control and abatement of noise pollution is a current and continuing problem, and at the present time industry is faced with government imposed noise levels under which manufacturing equipment must be operated. Accordingly, there is an increasing need for more efficient apparatuses for absorbing and abating noise due to the operation of industrial manufacturing equipment. Some of the industrial machines which are noise sources and which require noise abatement means are draw presses, hydro-forming machines, molding machines, piercing machines, die press machines, and the like. In a die press machine, for example, it is important to suppress the noise caused when a stripper plate is snapped back into its original position. A stripper plate represents a structure which is oscillating at a certain number of strokes per minute and which is decelerated to zero velocity at each end of a stroke, and within a ½ to 1 inch maximum stroke. The type of noise caused by the operation of a stripper plate on a press is typical of shop noises which are a hazard and a danger to the well-being and safety of the employees working in the area surrounding such a press. A continued impact noise creates noise levels which decrease the efficiency and morale of a press operator and other employees in the vicinity of the machine. Furthermore, the use of ear plugs and the like is frowned upon by agencies administrating the safety rules for shops, as well as by the employees' unions. In view of the foregoing, it is an important object of the present invention to provide a novel and improved shock absorber for preventing noise due to the operation of various types of industrial machinery, and which will reduce noise pollution in a manufacturing facility.

It is another object of the present invention to provide a sound and noise absorbing apparatus formed from a resilient type material, and which absorbs a maximum amount of impact and suppresses a proportional related noise. The noise preventing apparatus provides a means for diminishing or eliminating oscillatory loads of varying frequencies, duration and amplitudes, and which loads are classified as hard energy loads.

It is still another object of the present invention to provide a novel and improved sound and noise absorbing apparatus which is simple and compact in construction, economical to manufacture and efficient in operation.

It is a still further object of the present invention to provide a novel and improved sound and noise absorbing apparatus which can be made by any suitable method as, for example, by pressurized molding, and which is inverted dish-shaped in configuration and adapted to accommodate different loads in accordance with the type of resilient material used and the cross section configuration of the apparatus. The noise absorbing apparatus can be used as a single module or in a stacked or plural arrangement so as to provide units of varying noise absorbing capacities.

It is still another object of the present invention to provide a novel and improved noise preventing shock absorber which includes a resilient member that is dish-shaped in vertical cross section and provided with an axial bore therethrough, and with the peripheral surface of the axial bore forming an inner force-transmitting surface. An upper force-receiving means is bonded to said inner force-transmitting surface. The resilient member is provided with a peripheral outer force-transmitting surface concentric with and axially offset downwardly from the inner force-transmitting surface. The resilient member is also provided with an axially inward extended recess on the lower side thereof around said axial bore and within said outer force-transmitting surface. A lower force-receiving means is bonded to the outer force-transmitting surface. The lower force-receiving means may comprise a tube. The upper force-receiving means may comprise an inner tube in which is slidably mounted a tubular impact-receiving shaft or a solid impact-receiving shaft made from a plurality of operatively connected parts. The inner tube is bonded to the inner force-transmitting surface.

Other features and advantages of this invention will be apparent from the following detailed description, appended claims, and the accompanying drawings.

DESCRIPTION OF THE PREFERRED EMBODIMENTS

Figure 1:
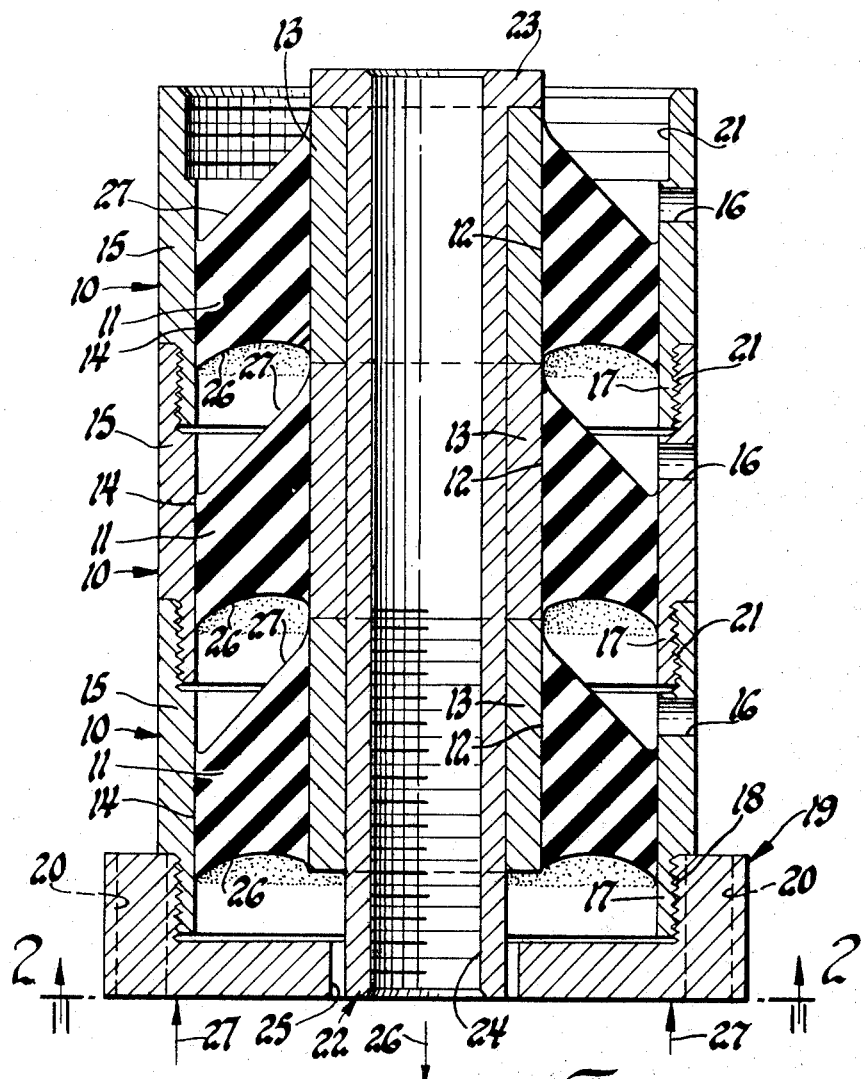
FIG. 1 is an elevational section view of a noise preventing shock absorber made in accordance with the principles of the present invention.
Figure 2:
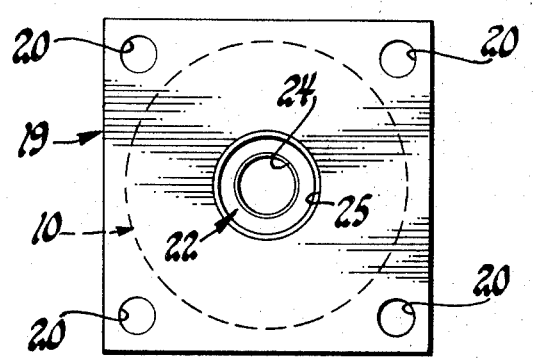
FIG. 2 is a bottom plan view of the shock absorber structure illustrated in FIG. 1, taken along the line 2—2 thereof, and looking in the direction of the arrows.

Referring now to the drawings and in particular to FIGS. 1 and 2, an illustrative embodiment of the invention is shown which comprises a stacked arrangement of a plurality of individual shock absorber members 10 made in accordance with the principles of the present invention. The embodiment of FIGS. 1 and 2 comprises three of the shock absorber members 10, but it will be understood that a shock absorber apparatus may be made to include one or more of the shock absorber members 10.

As shown in FIG. 1, each of the shock absorber members 10 includes a unitary resilient member 11 which is dish-shaped in vertical cross section and which is circular in plan form. Each shock absorber member 10 is concentrically formed around its vertical centerline. The resilient member 11 is provided with an axial bore 12 therethrough, and the peripheral surface of the axial bore 12 forms an inner force-transmitting surface. As shown in FIG. 1, each of the shock absorber members 10 includes an inner tube 13 which is made from any suitable material as, for example, a suitable metal, and which is bonded to the inner force-transmitting surface 12 by any suitable means. The resilient member 11 may be made from any suitable resilient material as, for example, rubber, a rubber-like material or an elastomeric material. A suitable synthetic elastomeric material is a urethane elastomeric material, and it is available on the market under the registered trademark "CYANA-PRENE." Any suitable adhesive may be used to bond the inner tube 13 to the resilient member 11. A typical adhesive that may be used is that described in U.S. Pat. No. 3,387,839.

The resilient member 11 is provided with peripheral outer force-transmitting surface 14 which is concentric with and axially offset downwardly from the inner force-transmitting surface 12. A lower force-receiving means is bonded to the outer force-transmitting surface 14, and said means comprises an outer tube 15 which is made from any suitable material as, for example, a suitable metal. The outer tube 15 is bonded to the resilient member 11 in the same manner as the inner tube 13.

As shown in FIG. 1, each of the outer tubes 15 is provided with at least one vent hole 16 for venting the inside of the tube 15 to the atmosphere. The lower end 17 of each of the outer tubes 15 is reduced in diameter and is provided with an outer threaded periphery. The lowermost shock absorber member 10 has the lower threaded portion 17 threadably mounted in a suitable threaded bore 18 in the upper face of a support member, in the form of a plate, generally indicated by the numeral 19. As shown in FIG. 2, the support plate 19 is provided with a plurality of holes 20 for the reception of suitable mounting bolts for mounting the shock absorber apparatus in an operative position for receiving an impact load.

As shown in FIG. 1, the upper end of each of the outer tubes 15 is provided on the inner surface with an enlarged threaded bore 21 which is adapted to threadably receive and retain the lower threaded end 17 of the next uppermost shock absorber member 10 for stacking a plurality of the shock absorber members 10 in an operative unit.

As shown in FIG. 1, an impact-receiving shaft, generally indicated by the numeral 22, is slidably mounted in the stacked inner tubes 13. The shaft 22 is provided on the upper end thereof with an impact-receiving flange 23 which is adapted to be seated on the upper end of the uppermost inner tube 13 for transmitting an impact from the shaft 22 into the uppermost inner tube 13. It will be seen that the uppermost inner tube 13 is seated on the upper end of the next below inner tube 13, and so on down to the lowermost shock absorber member 10. The impact-receiving shaft 22 is cylindrical or tubular in shape, and the lower end thereof is threaded as indicated by the numeral 24 for the threadable reception of a shaft or other suitable impact applying means. As shown in FIG. 1, the lower end of the shaft 22 extends downwardly through a suitable hole 25 formed through the support plate 19.

As shown in FIG. 1, each of the resilient members 11 is provided along the lower side or end thereof, around the axial bore 12 with an axially inward extended recess 26. The recess 26 extends between the inner force-transmitting surface 12 and the outer force-transmitting surface 14.

In the embodiment of FIG. 1, each of the resilient members 11 is provided with an upper surface 27 which is conically shaped radially outward from the upper end of the inner force-transmitting surface 12. The lower surface of each of the resilient members 11 in FIG. 1 is shaped concave upwardly, radially outward from the inner force-transmitting surface 12.

In use, the embodiment of FIGS. 1 and 2 would be disposed in an operative position whereby an impact or shock load could be received by the upper end of the shaft 22, so that the load is received by the flange 23 and transmitted into the upper inner tube 13 and thence downwardly to the other inner tubes 13 to distribute the load between the three shock absorber members 10. The impact load may also be applied to the shaft 22 at the lower end thereof, as indicated by the numeral 26. A suitable shaft may be threaded into the bore 24 in the lower end of the shaft 22. The shaft 22 may be interconnected with a moving member which is to impart a shock load thereto, or it may be successively engaged thereby and a suitable rubberlike member may be employed between the shaft and the load if the load imparting object is to strike the shaft 22 at its upper end.

The impact load is decelerated by the deforming of the general shape of the inverted dish-shaped resilient member 11. The displacement of the dish-shaped member 11 is resisted by counterforces 27 operating against the lower end of the support plate 19, as indicated in FIG. 1. The resilient member 11 experiences a combined shear and bending stress which decelerates the applied impact load. However, the shear stress is the predominant stress generated in the resilient member 11 during an impact absorbing operation, and assuming pure shear stress, it has been found that the most efficient resilient member 11 is one which has a shape as illustrated in FIG. 1. That is, a shape which is one that has an upper surface that is conically shaped radially outward from the upper end of the inner force-transmitting surface 12, and with a lower surface in the recess 26 that is shaped concave upwardly, radially outward from said inner force-transmitting surface 12 and wherein the vertical cross section of the resilient member 11 decreases radially outward from the axial bore so as to provide a constant vertical and circular cross section area progressively outward from the axial bore 12. Counter reaction forces are also built up in a radial outward, perpendicular direction, but they are resisted by the outer tube 15.

Figure 3:
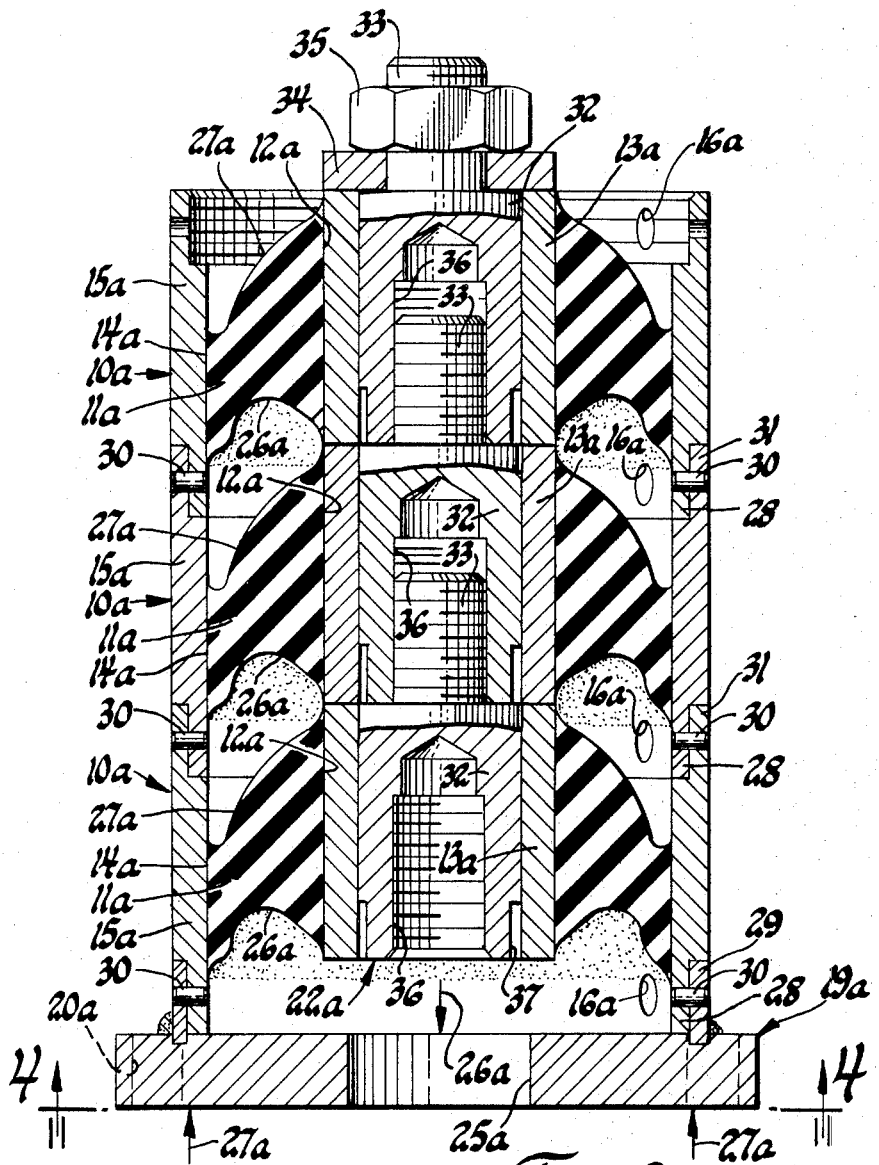
FIG. 3 is an elevational section view of a noise preventing shock absorber member, and showing a second embodiment of the invention.
Figure 4:
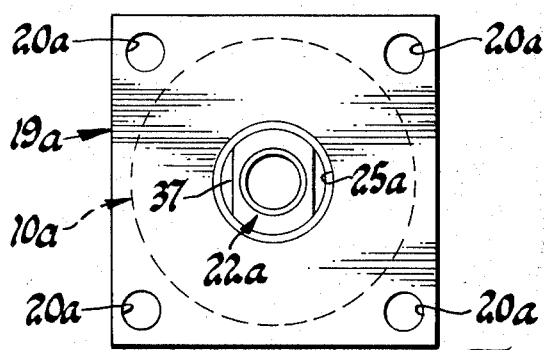
FIG. 4 is a bottom plan view of the shock absorber structure illustrated in FIG. 3, taken along the line 4—4 thereof, and looking in the direction of the arrows.

FIGS. 3 and 4 illustrate a second embodiment of the invention, and the parts thereof which are identical with the parts illustrated in the first embodiment of FIGS. 1 and 2 are marked with the same reference numerals followed by the small letter a. In the embodiment of FIGS. 3 and 4, the lower end of each outer tube 15a is provided with a stepped, smaller diameter end 20a which is adapted to be slidably mounted and seated in a circular support ring 29 which is fixed to the top of the mounting plate 19a by any suitable means, as by welding. Ring 29 is fixed to the outer tube lower end 28 by suitable retainer pins 30, which are press fitted in suitable holes formed through the tube end 28 and the ring 29. The upper end of each outer tube 15a is provided with an outwardly stepped inner periphery to form an extension 31 which slidably receives the lower end 28 of the next above outer tube 15a in the same manner as the mounting ring 29 receives the lower end of the lowermost outer tube 15a.

The embodiment of FIG. 3 has upper and lower surfaces 27a and 26a which are shaped differently from the corresponding parts of FIG. 1. In the embodiment of FIG. 3, the upper surface 27a of each resilient member 11a is shaped convex upwardly, radially outward from the upper end of the inner force-transmitting surface 12a. The lower surface in the recess 26a is shaped concave upwardly, radially outward from the inner force-transmitting surface 12a.

In the embodiment of FIG. 3, the shaft 22a is formed from a plurality of shaft members which each have a cylindrical body 32 that is slidably mounted in one of the inner tubes 13a. Each of the shaft members 32 is provided with a reduced diameter threaded solid shaft extension 33. As shown in FIG. 3, the uppermost shaft member 32 has its threaded head 33 extended upwardly beyond the upper end of the uppermost outer member 15a. A load transmitting means 34 in the form of a washer operatively mounted around the shaft 33 and seated on the upper end of the uppermost inner tube 13a for transmitting the load impressed on the shaft 22a onto the uppermost tube 13a and then downwardly by compression into the other inner tubes 13a. A suitable lock nut 35 is operatively mounted on the shaft 33, on the uppermost shaft member 32 for retaining the load transmitting washer 34 in place. The shaft members 32, the load transmitting washer 34 and the lock nut 35 may be made from any suitable material as, for example, a suitable metal. As shown in FIG. 3, the shaft member 32 below the uppermost shaft member 32 has its threaded shaft 33 threadably mounted in a threaded bore 36 which is axially formed in the lower end of the next above shaft member 32. Each of the shaft members 32 is provided on the lower end thereof with a pair of wrench flats 37. The embodiment of FIGS. 3 and 4 would function in the same manner as the embodiment of FIGS. 1 and 2.

Figure 5:
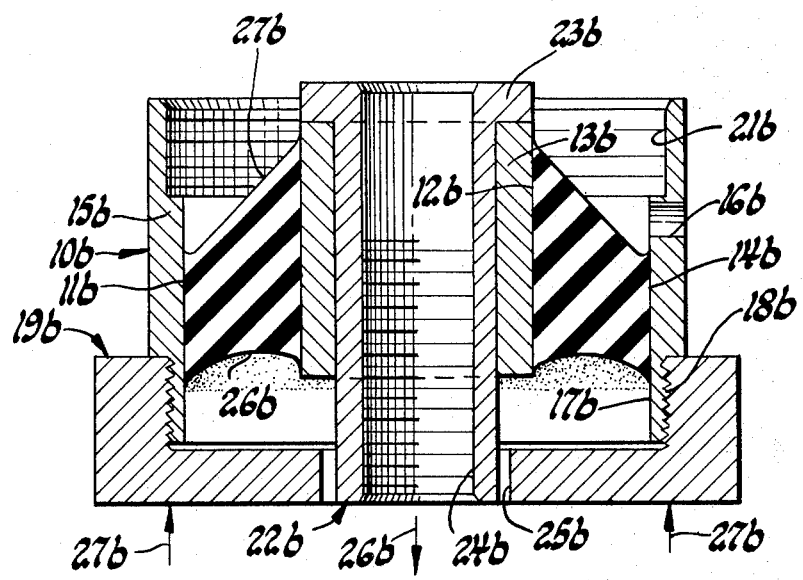
FIG. 5 is an elevational section view of a noise preventing shock absorber member, and showing a third embodiment of the invention.

FIG. 5 illustrates a shock absorber apparatus made in accordance with the invention, and wherein a single shock absorber member 10b is employed. The parts of the embodiment of FIG. 5 which are the same as the corresponding parts of the embodiment of FIG. 1 have been marked with the same reference numerals followed by the small letter b. All of the parts in the embodiment of FIG. 5 are the same as in the embodiment of FIG. 1, but a shorter shaft 22b is employed. The embodiment of FIG. 5 functions in the same manner as the individual shock absorber members 10 of the first embodiment of FIG. 1.

Figure 6:
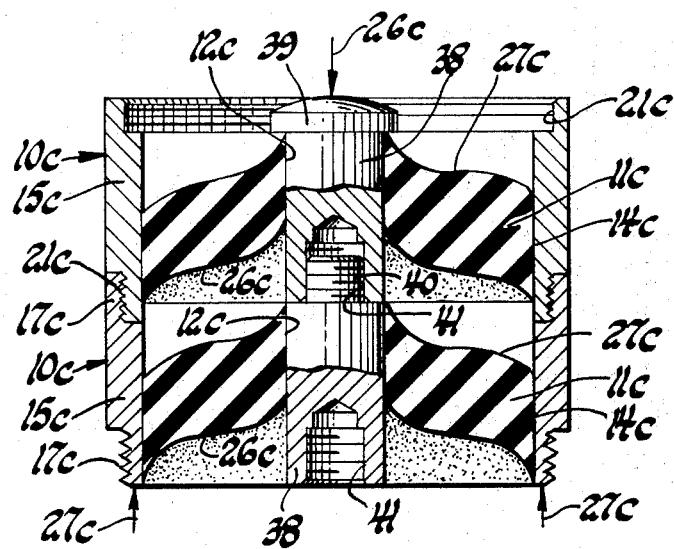
FIG. 6 is an elevational section view of a noise preventing shock absorber member, and showing a fourth embodiment of the invention.

FIG. 6 illustrates another embodiment of the invention wherein the force-receiving means comprises a shaft formed from a plurality of solid shaft members 38 which are bonded directly to the inner force-transmitting surfaces 12c of the resilient members 11c. The uppermost shaft member 38 is provided with an impact load head 39 which may be made from any suitable material for receiving an impact load 26c. The resisting forces 27c act against the lower end of the lowermost outer tube 15c. The outer tubes 15c are threadably engaged in the same manner as the first embodiment. The shaft member 38 next below the uppermost shaft member 38 is provided with an outwardly extended connector shaft 40 which is threadably mounted in a suitable bore 41 in the lower end of the uppermost shaft member 38.

In the embodiment of FIG. 6, the upper surface of the resilient member 11c is shaped convex upwardly, radially outward from the upper end of the inner force-transmitting surface 12c, and the lower surface is shaped convex downwardly, radially outward from the inner force-transmitting surface 12c. It will be understood that as many shock absorber members 10c as desired may be incorporated in a shock absorber unit. The embodiment of FIG. 6 functions in the same manner as the previously described embodiments.

It will be understood that the term "upper force-receiving means" as used in the claims hereafter includes not only the impact-receiving shaft illustrated in FIG. 6, but also the combination of the inner sleeve 13 and the shaft 22 of the embodiments of FIGS. 1 and 5, and the inner tubes 13a and shaft 22a of the embodiment of FIG. 3.

While it will be apparent that the preferred embodiments of the invention herein disclosed are well calculated to fulfill the objects above stated, it will be appreciated that the invention is susceptible to modification, variation and change.

What is claimed is:
1. A shock absorber comprising:
   a. a plurality of shock absorber members;
   b. each of said shock absorber members including a resilient member which is dish-shaped in vertical cross section and provided with an axial bore therethrough, with the peripheral surface of the axial bore forming an inner force-transmitting surface;
   c. an upper force-receiving shaft bonded to said inner force-transmitting surface of each resilient member;
   d. each of said resilient members being provided with a peripheral outer force-transmitting surface concentric with and axially offset downwardly from its inner force-transmitting surface;
   e. each of said resilient members being provided with an axially inward extended recess on the lower side thereof, around its axial bore and within its outer force-transmitting surface;
   f. a lower force-receiving tube bonded to said outer force-transmitting surface; and,
   g. said plurality of shock absorber members are disposed in a vertical stacked arrangement with the lower force receiving outer tubes thereof being operatively aligned with the outer tube of an upper shock absorber member being operatively seated on the upper end of the next below disposed shock absorber member.

2. A shock absorber as defined in claim 1 wherein:
   a. said upper force-receiving shaft comprises an inner tube.

3. A shock absorber as defined in claim 2, wherein:

a. an impact-receiving shaft is operatively mounted through said inner tubes.

4. A shock absorber having a plurality of shock absorber members as defined in claim 1, wherein:
   a. said plurality of shock absorber members are disposed in a vertically stacked arrangement with the outer tubes thereof being operatively connected together with the upper force-receiving shaft of a lower shock absorber member being operatively connected to the upper force-receiving shaft of the next above disposed shock absorber member; and, b. the upper force-receiving shaft of the uppermost shock absorber member is provided with an impact head on the upper end thereof.

5. A shock absorber having a plurality of shock absorber members as defined in claim 3, wherein:

a. said plurality of said shock absorber members are disposed in a vertically stacked arrangement with the outer tubes thereof being operatively connected together, and with the inner tube of an upper shock absorber member being operatively seated on the upper end of the next below disposed shock absorber member, and with said impact-receiving shaft extending through the inner tubes of said shock absorber members, and with the means on the upper end of said shaft engaging the upper end of the uppermost inner tube for transmitting an impact load to the inner tubes.

6. A shock absorber as defined in claim 5, wherein:

a. said impact-receiving shaft comprises a unitary tubular shaft having an impact-receiving flange on the upper end thereof which seats on the upper end of the uppermost inner tube, and said impact-receiving shaft being provided with means on the lower end thereof for receiving an impact load.

7. A shock absorber as defined in claim 3, wherein:

a. said impact-receiving shaft comprises a plurality of operatively connected shaft members;
b. the uppermost one of said shaft members having an impact head thereon for receiving an impact load;
c. load transmitting means carried on the uppermost one of said shaft members and engaging the upper end of the uppermost inner tube for transmitting an impact load thereto; and
d. the lowermost one of said shaft members being provided with means on the lower end thereof for receiving an impact load.

* * * * *